(12) United States Patent
Babu (10) Patent No.: US 12,091,288 B2
(45) Date of Patent: Sep. 17, 2024

(54) PNEUMATIC FLOW CONTROLLING DEVICE FOR A PNEUMATIC VACUUM ELEVATOR AND A METHOD THEREOF

(71) Applicant: Killakathu Ramanathan Babu, Tamilnadu (IN)

(72) Inventor: Killakathu Ramanathan Babu, Tamilnadu (IN)

(73) Assignee: KILLALATHU RAMANATHAN BABU (IN)

( * ) Notice: Subject to any disclaimer, the term of this patent is extended or adjusted under 35 U.S.C. 154(b) by 59 days.

(21) Appl. No.: 17/928,630

(22) PCT Filed: Sep. 10, 2020

(86) PCT No.: PCT/IB2020/058408
§ 371 (c)(1),
(2) Date: Nov. 30, 2022

(87) PCT Pub. No.: WO2021/245454
PCT Pub. Date: Dec. 9, 2021

(65) Prior Publication Data
US 2023/0137918 A1 May 4, 2023

(30) Foreign Application Priority Data
Jun. 2, 2020 (IN) .............................. 202041023082

(51) Int. Cl.
*B66B 9/04* (2006.01)
*G05D 16/20* (2006.01)

(52) U.S. Cl.
CPC .......... *B66B 9/04* (2013.01); *G05D 16/2022* (2019.01); *G05D 16/204* (2013.01)

(58) Field of Classification Search
CPC .... B66B 9/04; B66B 11/0423; G05D 16/2022
See application file for complete search history.

(56) References Cited

U.S. PATENT DOCUMENTS

| | | | | |
|---|---|---|---|---|
| 5,583,326 A | * | 12/1996 | Sors .......................... | B66B 9/04 |
| | | | | 187/277 |
| 6,085,873 A | * | 7/2000 | Macchi .................. | B65G 51/04 |
| | | | | 187/400 |

(Continued)

FOREIGN PATENT DOCUMENTS

| | | |
|---|---|---|
| CN | 203079477 U | 7/2013 |
| CN | 104401851 B | 2/2017 |

(Continued)

*Primary Examiner* — Diem M Tran
(74) *Attorney, Agent, or Firm* — Jason C. Cameron (57) ABSTRACT

A pneumatic flow controlling device is disclosed. The device includes a perforated component disposed on a bottom component coupled to a top surface of a pneumatic vacuum elevator. The perforated component includes multiple perforations to enable air circulation from outside to inside of the elevator cylinder. The device also includes a diaphragm component to expand and compress based on the air circulation. The device also includes a primary valve to allow an air supply to the elevator cylinder for controlling movement of an elevator cabin within a tubular pathway based on a control signal received from an elevator controller. The device also includes a secondary valve to allow the air supply to the elevator cylinder for dynamically varying speed of the elevator cabin at one or more landing positions.

9 Claims, 5 Drawing Sheets

(56) References Cited

U.S. PATENT DOCUMENTS 9,845,155 B2 * 12/2017 Brown ................ B66B 11/0226
2023/0249945 A1 * 8/2023 Alexanian ........... B66B 11/0005
                                                              187/250

FOREIGN PATENT DOCUMENTS

| EP | 0550904 A1 | * | 12/1992 |
| KR | 101160644 81 | | 6/2012 |
| KR | 20180073037 A | * | 12/2016 |
| WO | 2014133922 A1 | | 9/2014 |

* cited by examiner

PNEUMATIC FLOW CONTROLLING DEVICE FOR A PNEUMATIC VACUUM ELEVATOR AND A METHOD THEREOF

CROSS-REFERENCE TO RELATED APPLICATION

This Application claims priority from a Patent application filed in India having Patent Application No. 202041023082, filed on Jun. 2, 2020, and titled "A PNEUMATIC FLOW CONTROLLING DEVICE FOR A PNEUMATIC VACUUM ELEVATOR AND A METHOD THEREOF" and a PCT Application No. PCT/IB2020/058408 filed on Sep. 10, 2020, and titled "A PNEUMATIC FLOW CONTROLLING DEVICE FOR A PNEUMATIC VACUUM ELEVATOR AND A METHOD THEREOF".

BACKGROUND

Embodiments of the present disclosure relate to a mechanism for facilitating motion of an elevator and more particularly, to a pneumatic flow controlling device for a pneumatic vacuum elevator.

Conventional elevators are typically used in countervailing weights in order to facilitate a cabin moving up and down between various layers or floors at various heights inside the vertical passageways of office buildings, hospitals, factories and similar structures. In order to overcome such concept of countervailing the weights, pneumatic vacuum elevators are used for moving across various floors at various heights of the building. The pneumatic vacuum elevators use air pressure to cause the motion of the cabin within a thoroughfare or tubular cylinder that uses the air within it as a working fluid upon the confines of the cabin. The pneumatic vacuum elevators are supported by various components for smooth movement of the cabin across the various floors. Such various components include brakes, motors, valves, guide rail, and the like to ensure a safe and pleasant riding experience for each occupant within the pneumatic vacuum elevator. The valves among the various components help in in controlling the air pressure of the pneumatic vacuum elevator. Several types of valves are available in market for enabling ascending and descending motion of the pneumatic vacuum elevator within a tubular pathway.

Typically, the valves have been designed for controlling the flow of air to and from chambers in order to move an elevator cabin down in the tubular pathway. However, such conventional valves absorb tremendous amount of power in their operation. Also, for descent of the cabin, such valves are unable to properly balance the air pressure difference between the cylinders above the cabin and the atmospheric pressure. Moreover, the conventional air valves for activation during safely measurement are unable to allow the flow of air through the orifice in order to achieve a cabin descending speed.

Hence, there is a need for an improved a pneumatic flow controlling device for a pneumatic vacuum elevator and a method thereof in order to address the aforementioned issues.

BRIEF DESCRIPTION

In accordance with an embodiment of the present disclosure, a pneumatic flow controlling device is disclosed. The device includes a perforated component disposed on a bottom component coupled to a top surface of a pneumatic vacuum elevator. The perforated component includes multiple perforations to enable air circulation from outside to inside of the elevator cylinder. The device also includes a diaphragm component to expand and compress based on the air circulation. The device also includes a primary valve to allow air supply to the elevator cylinder for controlling movement of an elevator cabin within a tubular pathway based on a control signal received from an elevator controller. The device also includes a secondary valve to allow the air supply to the elevator cylinder for dynamically varying speed of the elevator cabin at one or more landing positions.

In accordance with another embodiment of the present disclosure, a pneumatic vacuum elevator with a pneumatic flow controlling device is disclosed. The pneumatic vacuum elevator includes an elevator cabin to accommodate one or more passengers. The pneumatic vacuum elevator also includes a motor unit which includes a pneumatic flow controlling device. The pneumatic flow controlling device includes a perforated component coupled to a top surface of a pneumatic vacuum elevator, wherein the perforated component includes multiple perforations to enable air circulation from outside to inside of the elevator cylinder. The device also includes a diaphragm component to expand and compress based on the air circulation. The device also includes a primary valve to allow air supply to the elevator cylinder for controlling movement of an elevator cabin within a tubular pathway based on a control signal received from an elevator controller. The device also includes a secondary valve to allow the air supply to the elevator cylinder for dynamically varying speed of the elevator cabin at one or more landing positions.

In accordance with another embodiment of the present disclosure, a method for providing a pneumatic flow controlling device to a pneumatic vacuum elevator is disclosed. The method includes disposing of a perforated component on a bottom component coupled to a top surface of a pneumatic vacuum elevator, wherein the perforated component comprises multiple perforations for enabling air circulation from outside to inside of the elevator cylinder. The method also includes coupling a diaphragm component with the perforated component and the bottom component for expanding and compressing based on the air circulation. The method also includes coupling a primary valve to the diaphragm component for allowing an air supply to the elevator cylinder for controlling movement of an elevator cabin within a tubular pathway based on a control signal received from an elevator controller. The method also includes coupling a secondary valve to an outer surface of the bottom component for allowing the air supply to the elevator cylinder to achieve variable speed for controlling the movement of the elevator cabin at one or more landing positions.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a pneumatic flow controlling device and a method thereof. The device includes a perforated component disposed on a bottom component coupled to a top surface of a pneumatic vacuum elevator. The perforated component includes multiple perforations to enable air circulation from outside to inside of the elevator cylinder. The device also includes a diaphragm component to expand and compress based on the air circulation. The device also includes a primary valve to allow air supply to the elevator cylinder for controlling movement of an elevator cabin within a tubular pathway based on a control signal received from an elevator controller. The device also includes a secondary valve to allow the air supply to the elevator cylinder for dynamically varying speed of the elevator cabin at one or more landing positions.

Figure 1:
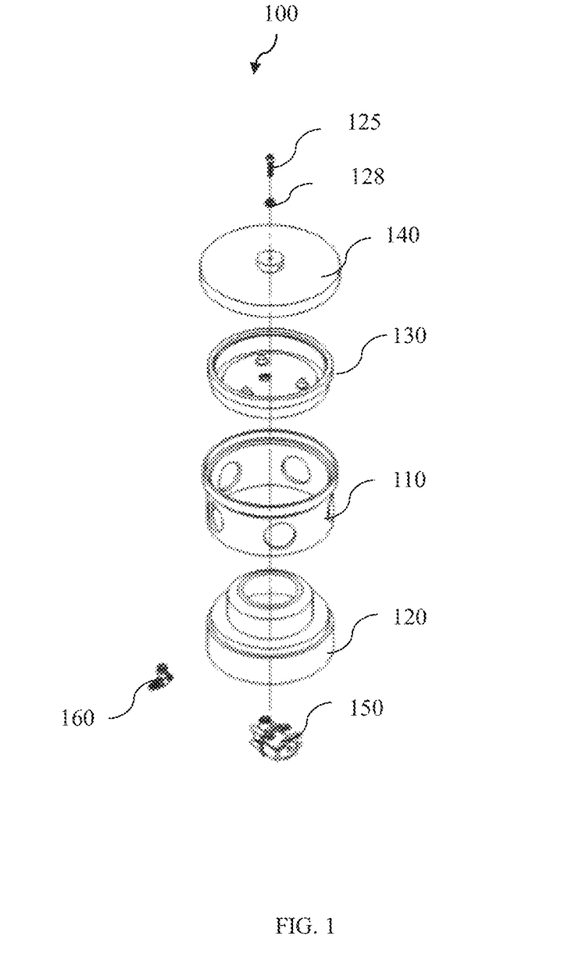
FIG. 1 is a schematic representation of an exploded view of a pneumatic flow controlling device with various components in aligned position in accordance with an embodiment of the present disclosure.

FIG. 1 is a schematic representation of an exploded view of a pneumatic flow controlling device 100 with various components in aligned position in accordance with an embodiment of the present disclosure. As used herein, the term 'pneumatic flow controlling device' is defined as a pneumatic flow valve system situated in a working space within the pneumatic vacuum elevator for air controlling utilized to move the pneumatic vacuum elevator. The device 100 includes a perforated component 110 disposed on a bottom component 120 coupled to a top surface of a pneumatic vacuum elevator. In one embodiment, the bottom component of the pneumatic flow controlling device 100 may be coupled to an integrated unit of elevator cylinder placed at the top surface of the pneumatic vacuum elevator. In another embodiment, the bottom component of the pneumatic flow controlling device 100 may be disposed at an external split unit assembly of the pneumatic vacuum elevator, wherein the external split unit assembly is coupled to the top surface of the pneumatic vacuum elevator via a pipe. The perforated component 110 includes multiple perforations to enable air circulation from outside to inside of the elevator cylinder.

The device 100 also includes a diaphragm component 130 to expand and compress based on the air circulation. The diaphragm component 130 is disposed over the perforated component 110. The diaphragm component 130 expands when the air flows through the multiple perforations from the outside atmosphere. Similarly, the diaphragm component 130 compresses when the air is released from the diaphragm component 130 to a low-pressure area. The device 100 also includes a regulation unit comprising an orifice, wherein the orifice enables the air circulation from outside atmosphere into the elevator cylinder for the actuation of the diaphragm component 130. In one embodiment, the orifice of the regulation unit is opened or covered for regulating the air circulation using an Allen screw 125 and a Hex flange locknut 128. The air circulation through the orifice into the external cylinder in predefined volume determines a rate of descending movement of the elevator cabin (not shown in FIG. 1).

In a specific component, the device 100 also includes a top component 140 mechanically coupled to the diaphragm component 130. In such embodiment, the top component 140 covers the pneumatic flow controlling device. In one embodiment, the perforated component 110 the bottom component 120, and the top component 140 are assembled using an adhesive material.

The device 100 also includes a primary valve 150 to allow an air supply to the elevator cylinder for controlling movement of an elevator cabin within a tubular pathway based on a control signal received from an elevator controller. In one embodiment, the primary valve 150 may include an electric solenoid valve. The primary valve 150 is coupled to the diaphragm component 130 and opens or closes to allow the air supply based on the control signal received from the elevator controller. Upon receiving the control signal, the primary valve 150 switches on to an open position and enables vacuum inside the elevator cylinder to pass through the primary valve 150.

The device 100 also includes a secondary valve 160 to allow the air supply to the elevator cylinder for dynamically varying speed of the elevator cabin at one or more landing positions. In one embodiment the secondary valve 160 may include a solenoid valve attached to an outer surface of the bottom component 120 of the pneumatic flow controlling device 100. The secondary valve 160 opens for a predefined interval of time simultaneously from closing of the primary valve, wherein the primary valve 150 closes based on the control signal received from the elevator controller. In one embodiment, the predefined interval of time may include a time interval of 3 seconds simultaneously from the closing of the primary valve 150.

Figure 2:
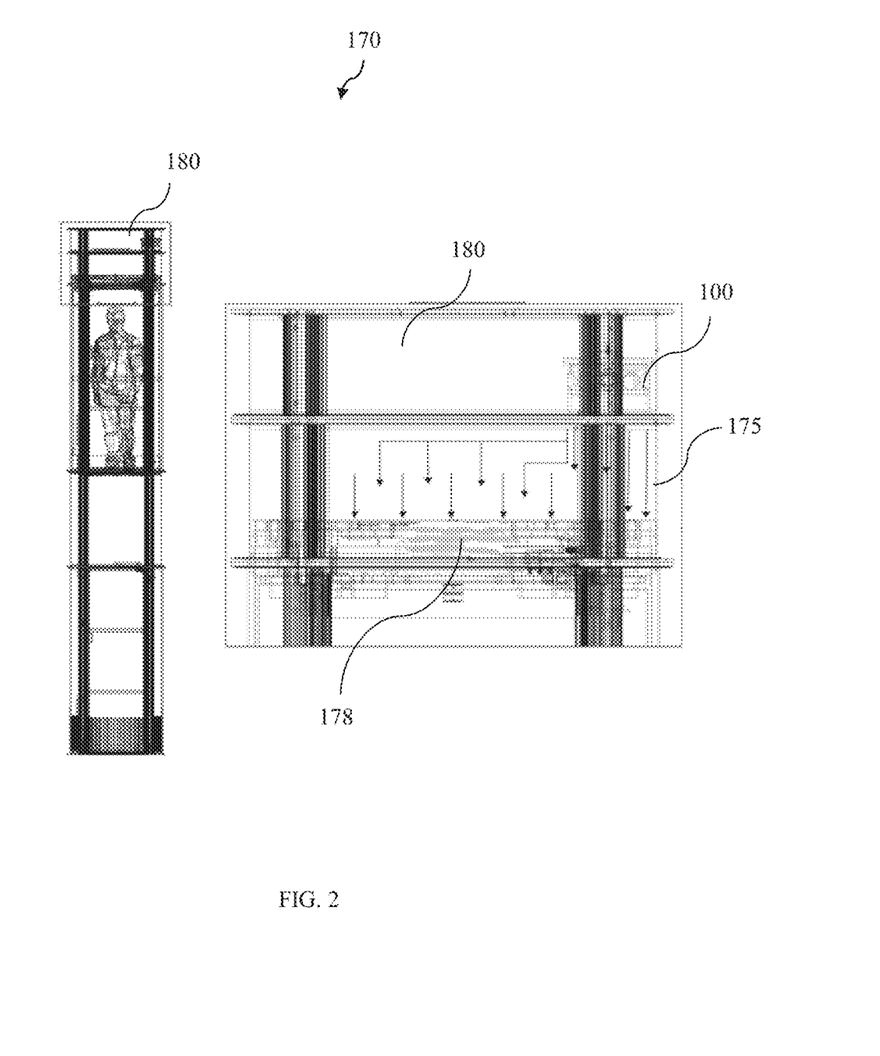
FIG. 2 illustrates a schematic representation of an embodiment of a pneumatic vacuum elevator with an assembly of a pneumatic flow controlling device in accordance with an embodiment of a present disclosure.

FIG. 2 illustrates a schematic representation of an embodiment of a pneumatic vacuum elevator 170 with an assembly of a pneumatic flow controlling device in accordance with an embodiment of a present disclosure. The pneumatic vacuum elevator 170 includes an elevator cabin 178 to accommodate one or more passengers. The elevator cabin 178 is inserted within an external cylinder assembly 175 and ascends or descends in a vertical direction within a tubular pathway.

The pneumatic vacuum elevator 170 also includes a motor unit 180 which includes a pneumatic flow controlling device 100. The motor control unit 180 is located at the top surface of the pneumatic vacuum elevator 100. In one embodiment, the pneumatic flow controlling device 100 is coupled to an integrated unit of elevator cylinder placed at the top surface of the pneumatic vacuum elevator. In another embodiment, the pneumatic flow controlling device 100 may be located at a convenient working space utilized in conjunction with the pneumatic vacuum elevator 170. The pneumatic flow controlling device 100 includes a perforated component which includes multiple perforations to enable air circulation from outside to inside of the elevator cylinder.

The device 100 also includes a diaphragm component (not shown in FIG. 2) to expand and compress based on the air circulation. The diaphragm component is disposed over the perforated component. The diaphragm component expands when the air flows through the multiple perforations from the outside atmosphere. Similarly, the diaphragm compresses when the air is released from the diaphragm component to a low-pressure area. The device 100 also includes a regulation unit comprising an orifice, wherein the orifice enables the air circulation from outside atmosphere into the elevator cylinder for actuation of the diaphragm component. In one embodiment, the orifice of the regulation unit is opened or covered for regulating the air circulation using an lien screw and a Hex flange lock nut.

The device 100 also includes a primary valve to allow air supply to the elevator cylinder for controlling movement of an elevator cabin within a tubular pathway based on a control signal received from an elevator controller. In one embodiment, the primary valve may include an electric solenoid valve. The primary valve is coupled to the diaphragm component and opens or closes to allow the air supply based on the control signal received from the elevator controller. Upon receiving the control signal, the primary valve switches on to an open position and enables vacuum inside the elevator cylinder to pass through the primary valve.

The device 100 also includes a secondary valve to allow the air supply to the elevator cylinder for dynamically varying speed of the elevator cabin at one or more landing positions. In one embodiment the secondary valve may include a solenoid valve attached to an outer surface of the bottom component of the pneumatic flow controlling device. The secondary valve opens simultaneously when the primary valve 150 closes. Similarly, the secondary valve 160 closes after the predefined time interval, which is set, wherein the primary valve closes based on the control signal received from the elevator controller. In one embodiment, the predefined interval of time may include a time interval of 3 seconds from closing of the primary valve.

In a particular component, the device 100 also includes a top component mechanically coupled to the diaphragm component. In such embodiment, the top component covers the pneumatic flow controlling device. In one embodiment, the perforated component, the bottom component, and the top component are assembled using an adhesive material.

Figure 3:
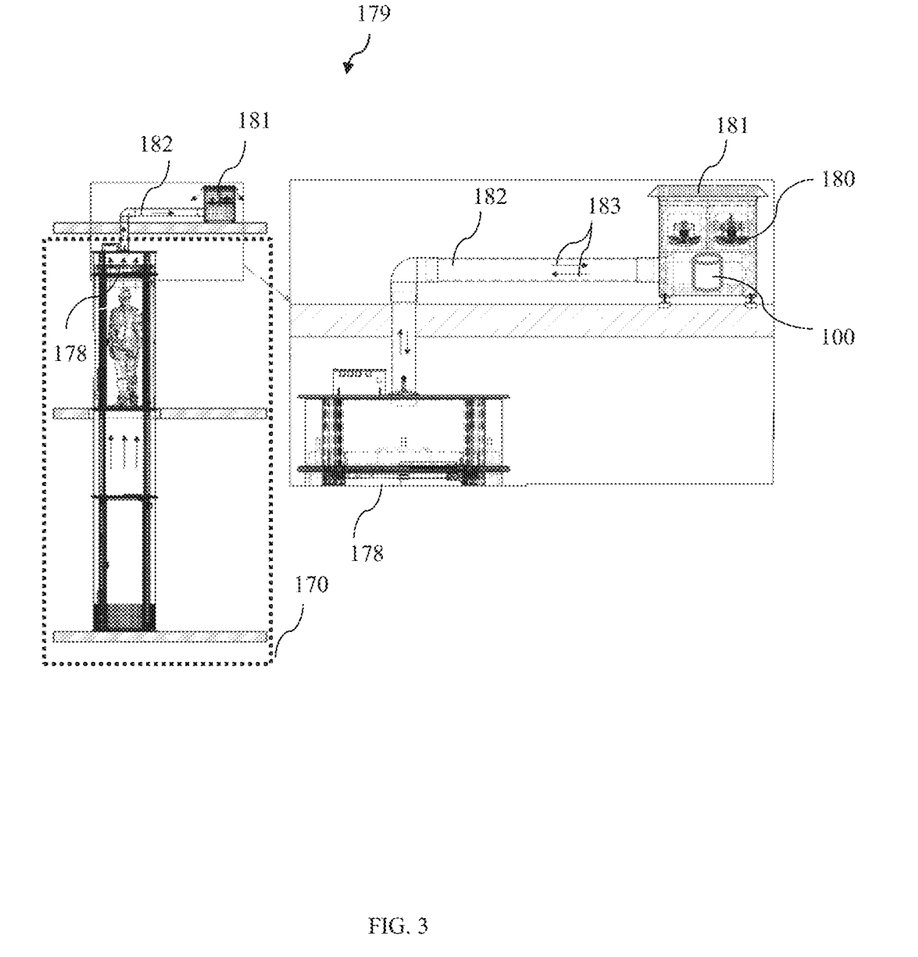
FIG. 3 illustrates a schematic representation of another embodiment of a pneumatic vacuum elevator with an assembly of a pneumatic flow controlling device in accordance with an embodiment of the present disclosure.

FIG. 3 illustrates a schematic representation of another embodiment 179 of a pneumatic vacuum elevator 170 with an assembly of a pneumatic flow controlling device in accordance with an embodiment of a present disclosure. As discussed above in FIG. 2, the pneumatic vacuum elevator 170 includes an elevator cabin 178 to accommodate one or more passengers. The elevator cabin 178 ascends or descends in a vertical direction within a tubular pathway for transiting the one or more passengers. In addition, the pneumatic vacuum elevator 170 also includes an external split unit assembly 181 located at a convenient working space in conjunction with the pneumatic vacuum elevator 170. The external split unit assembly is coupled to a top surface of the pneumatic vacuum elevator 170 via a pipe 182. In one embodiment, the pipe 182 may include a poly vinyl chloride (PVC) pipe. The split unit assembly includes a motor unit 180 and a pneumatic flow controlling device 100. The pneumatic flow controlling device 100 includes a perforated component disposed on a bottom component 120 coupled to a top surface of a pneumatic vacuum elevator 170. The perforated component includes multiple perforations to enable air circulation 183 from outside to inside of the elevator cylinder. The device 100 also includes a diaphragm component to expand and compress based on the air circulation 183. The device 100 also includes a primary valve to allow air supply to the elevator cylinder for controlling movement of an elevator cabin within a tubular pathway based on a control signal received from an elevator controller. The device 100 also includes a secondary valve to allow the air supply to the elevator cylinder for dynamically varying speed of the elevator cabin at one or more landing positions.

Figure 4:
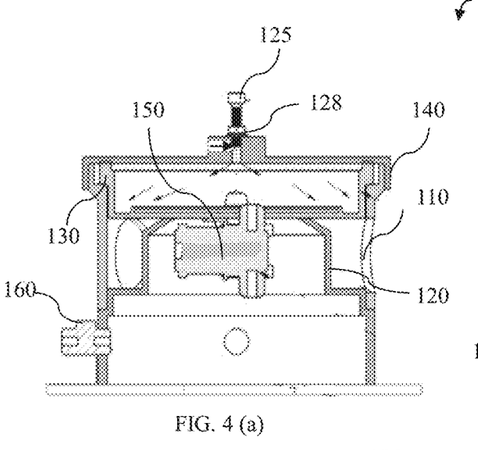
FIG. 4 illustrates a schematic representation of an embodiment of a pneumatic flow controlling device with functional orientation and air flow direction in accordance with an embodiment of the present disclosure.

FIG. 4 illustrates a schematic representation of an embodiment of a pneumatic flow controlling device 100 with functional orientation and air flow direction in accordance with an embodiment of the present disclosure. The pneumatic flow controlling device 100 used in the pneumatic vacuum elevator allows airflow from a motor unit to inside of an elevator cylinder, in such a way that it releases vacuum pressure from the inside of the elevator cylinder allowing an elevator cabin to descend. The pneumatic flow controlling device 100 includes a perforated component 110 disposed on a bottom component 120 coupled to a top surface of a pneumatic vacuum elevator. The device 100 also includes a diaphragm component 130 to expand and compress based on the air circulation. The diaphragm component 130 is disposed over the perforated component 110. The diaphragm component 130 compresses when the air flows through the multiple perforations from the outside atmosphere. Similarly, the diaphragm component 130 expands when the air is released from the diaphragm component 130 to a low-pressure area.

The device 100 also includes a top component 140 mechanically coupled to the diaphragm component 130. The top component 140 covers the pneumatic flow controlling device 100. The top component 140, the perforated component 110 and the bottom component 120 are assembled together using an adhesive material. A steel plate is placed inbuilt with the top component 140 the pneumatic flow controlling device 100. The device 100 also includes a primary valve 150 which is coupled with the diaphragm component 130. The device 100 also includes a secondary valve 160 which is attached in the outer surface of the bottom component (120) of the pneumatic flow controlling device 100.

FIG. 4 (*a*) illustrates a schematic representation of an embodiment of a pneumatic flow controlling device 100 with functional orientation and air flow direction at a normal condition in accordance with an embodiment of the present disclosure. In the normal condition of the pneumatic flow controlling device, the secondary valve 160 is closed, the primary valve 150 is also closed normally, and the diaphragm component 130 works in normal airflow conditions. In such a scenario, the airflow is not allowed to enter via the bottom component 120 of the flow controlling device 100 from the outside atmosphere. As, the airflow is not allowed to the flow controlling device 100, the elevator cabin does not move in downward direction. The top component 140 which is placed on top of the flow controlling device 100 is assembled using an Allen screw 125 and Hex flange lock nut 128 which further regulates the speed of the elevator cabin.

Figure 4B:
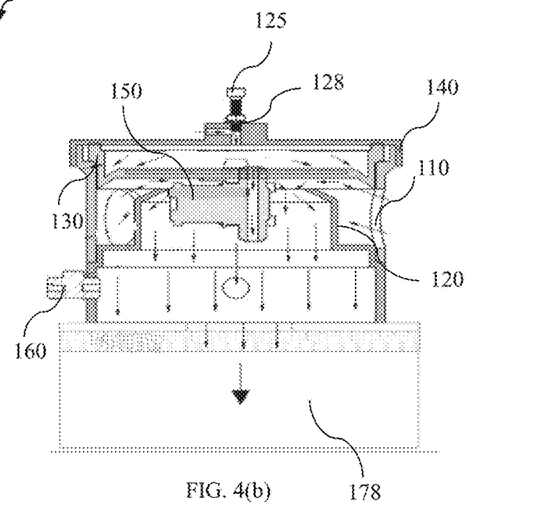

FIG. 4 (*b*) illustrates a schematic representation of an embodiment of a pneumatic flow controlling device 100 with functional orientation and airflow direction at compression condition in accordance with an embodiment of the present disclosure. During compression of the pneumatic flow controlling device 100, the secondary valve 160 is in closed condition. In such a condition, the elevator cabin receives an instruction to move downwards from the elevator controller (not shown in FIG. 3). The elevator controller sends a control signal to the primary valve 150, and the primary valve 150 switches to an open position. The atmospheric air passes through the perforated component 110 and enters into the elevator cylinder from the bottom component 120. Further, vacuum or low pressure from inside of the elevator cylinder passes through the primary valve 150 and the perforated component to an upper part of the diaphragm component 130 and making it compress towards the upper portion of the diaphragm component 130 formed by the top component 140 and diaphragm component 130. More specifically, the air flows out of the diaphragm component 130 to the low-pressure region. The top component 140 which is placed on top of the pneumatic flow controlling device 100 is assembled using the Allen screw 125 and the Hex flange lock nut 128 which is regulating the speed of the elevator cabin.

FIG. 4 (*c*) illustrates a schematic representation of an embodiment of a pneumatic flow controlling device 100 with functional orientation and airflow direction at normal condition with an open secondary valve in accordance with an embodiment of the present disclosure. During the normal condition of the pneumatic flow controlling device 100, the secondary valve 160 is immediately opened for 3 seconds from the time the primary valve 150 is closed. The primary valve 150 is closed based on a timer which is located on a panel circuit board of the elevator controller of the pneumatic vacuum elevator. The main function of the secondary valve 160 is to dynamically vary the speed of the elevator cabin at one or more landing positions.

Figure 5:
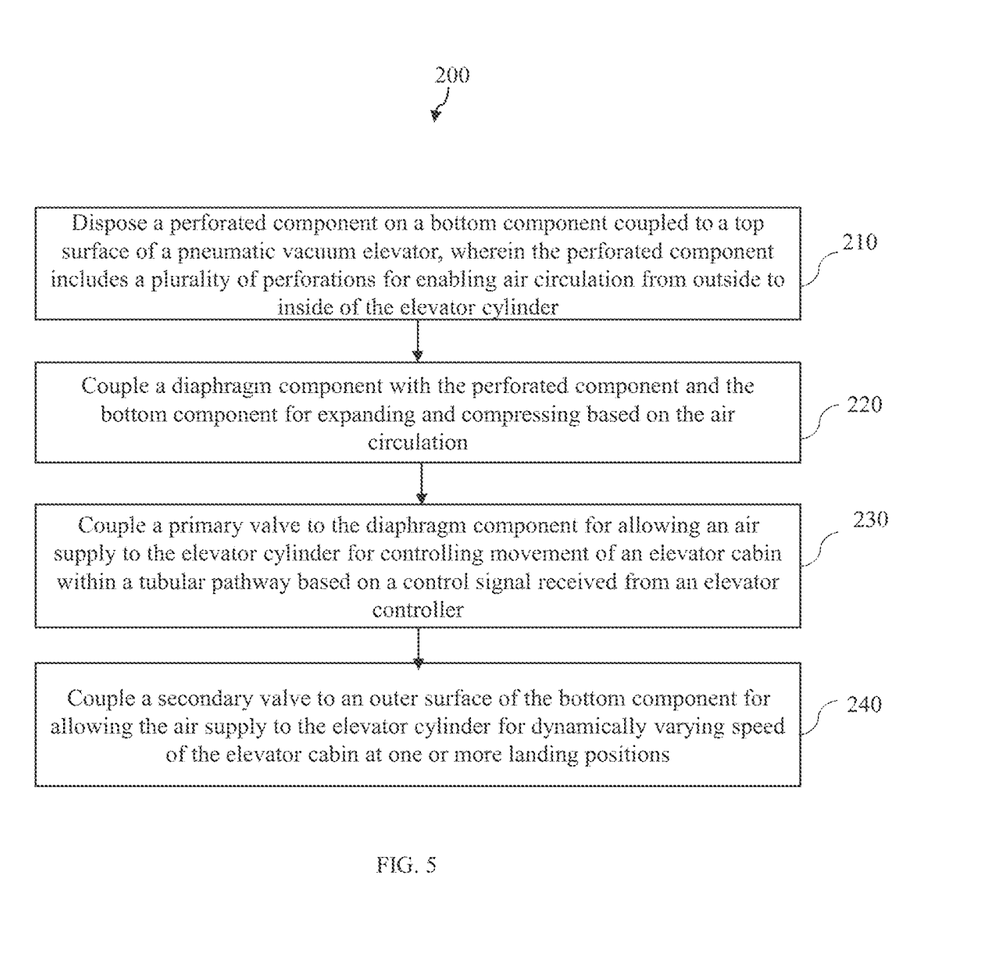
FIG. 5 is a flow chart representing the steps involved in a method for providing a pneumatic flow controlling device to a pneumatic vacuum elevator in accordance with the embodiment of the present disclosure.

FIG. 5 is a flow chart representing the steps involved in a method 200 for providing a pneumatic flow controlling device to a pneumatic vacuum elevator in accordance with the embodiment of the present disclosure. The method 200 includes disposing of a perforated component on a bottom component coupled to a top surface of a pneumatic vacuum elevator, wherein the perforated component includes multiple perforations for enabling air circulation from outside to inside of the elevator cylinder in step 210. In one embodiment, the disposing of the perforated component on the bottom component may include disposing of the perforated component on the bottom component coupled with the external cylinder assembly.

The method 200 also includes coupling a diaphragm component with the perforated component and the bottom component for expanding and compressing based on the air circulation in step 220. In one embodiment, coupling the diaphragm component with the perforated component and the bottom component may include coupling the diaphragm component, with the perforated component and the bottom component using an adhesive material. In such embodiment, coupling the diaphragm component may include coupling the diaphragm component with the perforated component and the bottom component for actuation of the diaphragm component based on the air circulation.

The method 200 also includes coupling a primary valve to the diaphragm component for allowing an air supply to the elevator cylinder for controlling movement of an elevator cabin within a tubular pathway based on a control signal received from an elevator controller in step 230. In one embodiment, coupling the primary valve to the diaphragm component may include coupling an electric solenoid valve to the diaphragm component. The method 200 also includes coupling a secondary valve to an outer surface of the bottom component for allowing the air supply to the elevator cylinder for dynamically varying speed of the elevator cabin at one or more landing positions in step 240.

Various embodiments of the present disclosure provide an airflow controlling device which consumes low power for operation and facilitates the movement of the pneumatic vacuum elevator within the tubular pathway.

Moreover, the present disclosed device reduces vibration or jerk movement due to sudden stop or halt of the elevator cabin of the pneumatic vacuum elevator while landing at the one or more positions. As a result, the present disclosed device benefits the passenger in the elevator cabin by providing smooth riding experience in the one or more landing positions.

Furthermore, the present disclosed device enables dynamically regulating the speed of the elevator cabin of the pneumatic vacuum elevator at the one or more landing positions by ensuring safety measurement and also enables smooth descending of the elevator cabin.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A pneumatic flow controlling device comprising:
   a perforated component disposed on a bottom component coupled to a top surface of a pneumatic vacuum elevator, wherein the perforated component comprises a plurality of perforations to enable air circulation from outside to inside of the elevator cylinder;
   a diaphragm component mechanically coupled to the perforated component and the bottom component, wherein the diaphragm component is configured to expand and compress based on the air circulation;
   a primary valve mechanically coupled to the diaphragm component, wherein the primary valve is configured to allow an air supply to the elevator cylinder for controlling movement of an elevator cabin within a tubular pathway based on a control signal received from an elevator controller; and
   a secondary valve mechanically coupled to an outer surface of the bottom component, wherein the secondary valve is configured to allow the air supply to the elevator cylinder for dynamically varying speed of the elevator cabin at one or more landing positions,
   wherein the secondary valve opens within a predefined interval of time upon closing of the primary valve, wherein the primary valve closes based on the control signal received from the elevator controller.

2. The device as claimed in claim 1, wherein the bottom component is coupled to an integrated unit of elevator cylinder placed at the top surface of the pneumatic vacuum elevator.

3. The device as claimed in claim 1, wherein the bottom component of the pneumatic flow controlling device is disposed at an external split unit assembly of the pneumatic vacuum elevator, wherein the external split unit assembly is coupled to the top surface of the pneumatic vacuum elevator via a pipe.

4. The device as claimed in claim 1, comprising a top component mechanically coupled to the diaphragm component, wherein the top component is configured to cover the pneumatic flow controlling device.

5. The device as claimed in claim 1, comprising a regulation unit comprising an orifice, wherein the orifice enables the air circulation from outside atmosphere into the elevator cylinder for actuation of the diaphragm component.

6. The device as claimed in claim 5, wherein the orifice of the regulation unit is opened or covered for regulating the air circulation using an Allen screw and a Hex flange lock nut.

7. The device as claimed in claim 6, wherein the air circulation through the orifice into the external cylinder in predefined volume determines a rate of descending movement of the elevator cabin.

8. A pneumatic vacuum elevator with a pneumatic flow controlling device comprising:
   an external cylinder assembly comprising an elevator cabin configured to accommodate one or more passengers;
   a motor unit mechanically coupled to the external cylinder assembly, wherein the motor unit comprises the pneumatic flow controlling device comprising:
      a perforated component disposed on a bottom component placed on a top surface of an elevator cylinder, wherein the perforated component comprises a plurality of perforations to enable air circulation from outside to inside of the elevator cylinder;
      a diaphragm component mechanically coupled to the perforated component and the bottom component, wherein the diaphragm component is configured to expand and compress based on the air circulation;
      a primary valve mechanically coupled to the diaphragm component, wherein the primary valve is configured to allow an air supply to the elevator cylinder for controlling movement of an elevator cabin within a tubular pathway based on a control signal received from an elevator controller; and
      a secondary valve mechanically coupled to an outer surface of the bottom component, wherein the secondary valve is configured to allow the air supply to the elevator cylinder for dynamically varying speed of the elevator cabin at one or more landing positions,
      wherein the secondary valve opens within a predefined interval of time upon closing of the primary valve, wherein the primary valve closes based on the control signal received from the elevator controller.

9. A method for providing a pneumatic flow controlling device to a pneumatic vacuum elevator comprising:
   disposing a perforated component on a bottom component coupled to a top surface of a pneumatic vacuum elevator, wherein the perforated component comprises a plurality of perforations for enabling air circulation from outside to inside of the elevator cylinder;
   coupling a diaphragm component with the perforated component and the bottom component for expanding and compressing based on the air circulation;
   coupling a primary valve to the diaphragm component for allowing an air supply to the elevator cylinder for controlling movement of an elevator cabin within a tubular pathway based on a control signal received from an elevator controller; and
   coupling a secondary valve to an outer surface of the bottom component for allowing the air supply to the elevator cylinder for dynamically varying speed of the elevator cabin at one or more landing positions.

* * * * *